US010562436B2

(12) United States Patent
Petrucci et al.

(10) Patent No.: US 10,562,436 B2
(45) Date of Patent: Feb. 18, 2020

(54) PORTABLE DUNNAGE BAG INFLATOR

(71) Applicant: Signode Industrial Group LLC, Glenview, IL (US)

(72) Inventors: Peter P. Petrucci, Scranton, PA (US); Anthony K. Beard, Poyen, AR (US); Thomas A. Ketzer, Wauconda, IL (US); Jeffrey Osisek, Hawthorne Woods, IL (US); Mark J. Caires, San Ramon, CA (US)

(73) Assignee: Signode Industrial Group LLC, Glenview, IL (US)

( * ) Notice: Subject to any disclaimer, the term of this patent is extended or adjusted under 35 U.S.C. 154(b) by 1299 days.

(21) Appl. No.: 14/326,132

(22) Filed: Jul. 8, 2014

(65) Prior Publication Data
US 2015/0034196 A1 Feb. 5, 2015

Related U.S. Application Data

(60) Provisional application No. 61/860,042, filed on Jul. 30, 2013.

(51) Int. Cl.
*B60P 7/06* (2006.01)
*F04D 25/06* (2006.01)
(Continued)

(52) U.S. Cl.
CPC .............. *B60P 7/065* (2013.01); *F04D 17/16* (2013.01); *F04D 25/06* (2013.01);
(Continued)

(58) Field of Classification Search
CPC ........ F04D 27/008; F04D 17/16; F04D 25/08; F04D 29/601; F04D 25/06; F04D 25/0673; B60P 7/065
(Continued)

(56) References Cited

U.S. PATENT DOCUMENTS 2,960,942 A 11/1960 Pier et al.
3,076,472 A 2/1963 Newell
(Continued)

FOREIGN PATENT DOCUMENTS

AU 748188 3/2000
CN 102 788 017 11/2012
(Continued)

OTHER PUBLICATIONS

International Search Report and Written Opinion for International Application No. PCT/US2014/046674 dated Jan. 20, 2015 (12 pages).
(Continued)

*Primary Examiner* — Charles G Freay
*Assistant Examiner* — Lilya Pekarskaya
(74) *Attorney, Agent, or Firm* — Neal, Gerber & Eisenberg LLP

(57) ABSTRACT

Various embodiments of the present disclosure provide a portable dunnage bag inflator that provides a compact, pressurized source of air and that is easily mounted onto a movable cargo mover (such as a forklift truck or a pallet jack). Generally, the portable dunnage bag inflator includes an impellor-driven blower that, in operation, draws air at atmospheric pressure through an air intake grid or air inlet into the impellor and expels the air through an inflation hose. Since the portable dunnage bag inflator includes an impellor-driven blower, the pressure of the expelled air is higher than atmospheric pressure. This enables dunnage bags to be inflated to the desired specifications at point-of-use (e.g., during or after loading of cargo into a cargo container) and eliminates the need for a compressed air supply.

11 Claims, 6 Drawing Sheets

(51) Int. Cl.
*F04D 25/08* (2006.01)
*F04D 17/16* (2006.01)
*F04D 27/00* (2006.01)
*F04D 29/60* (2006.01)

(52) U.S. Cl.
CPC ......... *F04D 25/0673* (2013.01); *F04D 25/08* (2013.01); *F04D 27/008* (2013.01); *F04D 29/601* (2013.01); *Y10T 137/6914* (2015.04)

(58) Field of Classification Search
USPC ............ 417/360, 423.15, 234; 248/210, 214, 248/227.4, 309.1, 201
See application file for complete search history.

(56) References Cited

U.S. PATENT DOCUMENTS

| | | | |
|---|---|---|---|
| 3,098,455 A | 7/1963 | McElroy et al. | |
| 3,160,118 A | 12/1964 | Newell | |
| 3,808,981 A | 5/1974 | Shaw | |
| 3,915,096 A | 10/1975 | Salisbury et al. | |
| 4,102,364 A | 7/1978 | Leslie et al. | |
| 4,146,069 A | 3/1979 | Angarola et al. | |
| 4,146,070 A | 3/1979 | Angarola et al. | |
| 4,418,737 A | 12/1983 | Goodell et al. | |
| 4,583,566 A | 4/1986 | Kalavitz | |
| 4,872,492 A | 10/1989 | McAnally et al. | |
| 4,921,402 A * | 5/1990 | Nelson | B64D 1/04 137/625.48 |
| 5,056,558 A | 10/1991 | Rodgers | |
| 5,082,244 A | 1/1992 | Krier et al. | |
| 5,180,456 A | 1/1993 | Schultz et al. | |
| 5,339,602 A | 8/1994 | Landers et al. | |
| 5,437,301 A | 8/1995 | Ramsey | |
| 5,454,407 A | 10/1995 | Huza et al. | |
| 5,552,003 A | 9/1996 | Hoover et al. | |
| 5,566,728 A * | 10/1996 | Lange | B65D 81/052 141/10 |
| 5,806,572 A * | 9/1998 | Voller | B65D 81/052 141/10 |
| 5,829,492 A | 11/1998 | Gavronsky et al. | |
| 5,862,843 A | 1/1999 | Corbitt | |
| 5,876,359 A * | 3/1999 | Bock | A61H 9/0078 601/150 |
| 5,947,168 A | 9/1999 | Viard et al. | |
| 6,085,744 A | 7/2000 | Andersen | |
| 6,253,806 B1 | 7/2001 | Sperry et al. | |
| 6,293,147 B1 | 9/2001 | Parker et al. | |
| 6,457,921 B1 | 10/2002 | Freeman | |
| 6,530,751 B1 | 3/2003 | Song et al. | |
| 6,561,236 B1 * | 5/2003 | Sperry | B05B 1/005 141/114 |
| 6,569,283 B1 | 5/2003 | Sperry et al. | |
| 6,676,042 B2 | 1/2004 | Howlett, Jr. et al. | |
| 6,729,110 B2 | 5/2004 | Sperry et al. | |
| 6,746,190 B2 | 6/2004 | Freeman | |
| 6,793,469 B2 | 9/2004 | Chung | |
| 7,063,514 B1 * | 6/2006 | Wu | F04D 25/084 417/317 |
| 7,073,545 B2 | 7/2006 | Smith et al. | |
| 7,127,762 B1 | 10/2006 | Lau | |
| 7,320,347 B2 | 1/2008 | Ramsey et al. | |
| 7,434,600 B1 | 10/2008 | Swierkocki et al. | |
| 7,455,086 B1 | 11/2008 | Elze et al. | |
| 7,510,359 B2 | 3/2009 | Sperry et al. | |
| 7,571,500 B2 * | 8/2009 | Wu | A47C 27/082 141/197 |
| 7,588,425 B2 | 9/2009 | Chung | |
| 7,610,929 B2 | 11/2009 | Zielinski et al. | |
| 7,644,739 B1 | 1/2010 | Vezzosi et al. | |
| 7,677,267 B2 | 3/2010 | Warnick | |
| 7,793,687 B2 | 9/2010 | Smith et al. | |
| 7,887,303 B2 * | 2/2011 | Sadkowski | F04B 35/06 417/234 |
| 7,913,724 B2 | 3/2011 | Pansegrouw | |
| 7,980,799 B1 | 7/2011 | Rioux et al. | |
| 8,133,039 B2 * | 3/2012 | Anderson | A61H 9/0078 137/355.16 |
| 8,162,009 B2 | 4/2012 | Chaffee | |
| 8,413,278 B2 | 4/2013 | Chaffee | |
| 8,414,272 B2 * | 4/2013 | Swisher | A61H 9/0078 137/355.16 |
| 2004/0181156 A1 | 9/2004 | Kingsford et al. | |
| 2012/0114505 A1 | 5/2012 | Pansegrouw et al. | |
| 2013/0139601 A1 | 6/2013 | Tschantz et al. | |

FOREIGN PATENT DOCUMENTS

EP 2 517 965 10/2012
WO WO 2005/085647 9/2005

OTHER PUBLICATIONS

European Examination Report for European Application No. 14 747 242.7 dated Feb. 8, 2017 (6 pages).

* cited by examiner

PORTABLE DUNNAGE BAG INFLATOR

PRIORITY CLAIM

This application claims priority to and the benefit of U.S. Provisional Patent Application No. 61/860,042, filed on Jul. 30, 2013, the entire contents of which are incorporated herein by reference.

BACKGROUND

Inflatable dunnage bags are commonly used to stabilize cargo during transportation of cargo containers (such as railroad cars and semi-trailers), which improves safety and reduces the likelihood of damage to the cargo. Generally, after some or all of the cargo is loaded into a cargo container, one or more dunnage bags are positioned in any voids or spaces between the cargo and/or between the cargo and the walls of the cargo container. The dunnage bags are inflated to a designated operating pressure using a pneumatic source. In most known implementations in the load securement industry, a pneumatic compressor is employed as the pneumatic source. This pneumatic compressor is typically a large-scale, stationary pneumatic compressor centrally located in the warehouse or factory from which the cargo is being transported.

The dunnage bags may be inflated and positioned in the voids or spaces either after all of the cargo has been loaded into the cargo container or intermittently during loading, such as after each piece of cargo is loaded. In the latter instances, the user loads some of the cargo into the cargo container using as cargo mover (such as a forklift truck or a pallet jack), inflates one or more dunnage bags, positions the dunnage bags in any voids or spaces surrounding that cargo, and repeats the process for additional cargo until all of the cargo is loaded and all of the dunnage bags are inflated and positioned.

One way in which users may inflate the dunnage bags is by inflating the dunnage bags within the cargo container itself (i.e., at point-of-use) using the stationary pneumatic compressor. In these cases, the user locates a compressed air hose connected to the stationary pneumatic compressor and brings the compressed air hose into the cargo container. The user then inflates the dunnage bags using the compressed air hose (and an appropriate inflator tool) and positions the inflated dunnage bags in the void(s) or space(s).

Various problems arise in these instances. Because the compressed air hose is typically stored at the stationary pneumatic compressor, it is time consuming for the user to travel to retrieve the compressed air hose whenever the user desires to inflate a dunnage bag. Since the compressed air hose has a finite length, in some instances the compressed aft hose may be too short to reach the cargo container and, therefore, the stationary pneumatic compressor is not able to deliver the compressed air at the point-of-use to inflate the dunnage bag(s). In other words, in these instances, there is no way to route the compressed air from the stationary pneumatic compressor to the dunnage bag(s) to inflate the dunnage bag(s) and, therefore, more time-consuming, less environmentally friendly, and more expensive solutions must be employed (such as alternatives to dunnage bags or the alternative inflation process described below).

Additionally, the long compressed air hose itself can be problematic as it is likely to snag, rip, or cause a tripping hazard within the warehouse or factory. Further, since the stationary pneumatic compressor by definition employs compressed air to fill the dunnage bag(s), one must pay for the energy to manufacture the compressed air, pay to store and maintain the compressed air, pay for floor space to store the pneumatic compressor itself, and pay for any required maintenance when the pneumatic compressor breaks down. Additionally, in instances in which the user desires to inflate and position dunnage bags intermittently during loading of the cargo, the user must repeatedly bring the compressed air hose back and forth into and out of the cargo container to ensure that the compressed air hose does not interfere with the loading of the cargo, which adds substantial time to the cargo loading process.

Another (less frequently used) way in which users may inflate the dunnage bags is by inflating the dunnage bags at the stationary pneumatic compressor itself. In these instances, after loading some or all of the cargo into the cargo container, the user brings deflated dunnage bags to the stationary pneumatic compressor. The user inflates the dunnage bags to the designated operating pressure using the stationary pneumatic compressor. The user then brings the inflated dunnage bags back to the cargo container and positions the inflated dunnage bags in the void(s) or space(s).

Various problems arise in these instances as well. Since the stationary pneumatic compressor is typically located relatively far from the cargo loading zone, it is time consuming for the user to travel back and forth to the stationary pneumatic compressor whenever the user desires to inflate a dunnage bag. Additionally, the fact that the user is not near the cargo container when the user is inflating the dunnage bags makes it difficult for the user to inflate the dunnage bags to the correct size, and requires the user to deflate and re-inflate incorrectly filled dunnage bags. Further, as noted above, since the stationary pneumatic compressor by definition employs compressed air to fill the dunnage bag(s), one must pay for the energy to manufacture the compressed air, pay to store and maintain the compressed air, pay for floor space to store the pneumatic compressor itself, and pay for any required maintenance when the pneumatic compressor breaks down. Additionally, in instances in which the user desires to inflate and position dunnage bags intermittently during loading of the cargo, the user must repeatedly bring the dunnage bags back and forth to the stationary pneumatic compressor to inflate them, which adds substantial time to the cargo loading process.

Accordingly, there is a need for a new and improved apparatus for inflating dunnage bags that solves these problems.

SUMMARY

Various embodiments of the present disclosure provide a portable dunnage bag inflator that provides a compact, pressurized source of air and that is easily mounted onto a movable cargo mover (such as a forklift truck or a pallet jack). Generally, the portable dunnage bag inflator includes an impellor-driven blower that, in operation, draws air at atmospheric pressure through an air intake grid or air inlet into the impellor and expels the air through an inflation hose. Since the portable dunnage hag inflator includes an impellor-driven blower, the pressure of the expelled air is higher than atmospheric pressure. This enables dunnage bags to be inflated to the desired specifications at point-of-use (e.g., during or after loading of cargo into a cargo container) and eliminates the need for a compressed air supply.

In one embodiment, the portable dunnage bag inflator of the present disclosure includes: (a) a pressurized air generator defining one or more air inlet openings and an air outlet, the pressurized air generator configured to draw air at a first pressure through the one or more air inlet openings into the pressurized air generator and expel the air at a second higher pressure through the air outlet; (b) a cargo mover mounting bracket attached to the pressurized air generator and configured to attach to a frame of a cargo mover; and (c) an inflation hose assembly fluidly connected to the air outlet of the pressurized air generator.

In another embodiment, the portable dunnage hag inflator of the present disclosure includes: (a) a pressurized air generator including; (i) a housing defining one or more air inlet openings therethrough and an air outlet therethrough, (ii) an impellor mounted within the housing, and (iii) a motor mounted within the housing and connected to the impellor such that the motor is configured to drive the impellor such that the impellor draws air at a first pressure through the one or more air inlet openings into the impellor and expels the air at the second higher pressure through the air outlet; (b) a cargo mover mounting bracket attached to the housing of the pressurized air generator and configured to attach to a frame of a cargo mover; and (c) an inflation hose assembly fluidly connected to the air outlet of the pressurized air generator.

In another embodiment, the portable dunnage bag inflator of the present disclosure includes: (a) a pressurized air generator including: (i) a housing including: (A) housing base including a plurality of walls, one of which defines one or more air inlet openings therethrough and one of which defines an air outlet therethrough; and (B) a cover attached to the housing base; (ii) an impellor mounted within the housing; and (iii) an electric motor mounted within the housing, electrically connectible to a power source of a cargo mover, and connected to the impellor such that the electric motor is configured to drive the impellor such that the impellor draws air at substantially atmospheric pressure through the one or more air inlet openings into the impellor and expels the air at the second higher pressure through the air outlet; (b) a cargo mover mounting bracket attached to the housing of the pressurized air generator and configured to attach to a frame of the cargo mover; and (c) an inflation hose assembly fluidly connected to the of outlet of the pressurized air generator, the inflation hose assembly including: (i) an inflation hose, (ii) a hose connector on one end of the inflation hose and configured to connect the inflation hose to the pressurized air generator, and (iii) an inflator head on an opposite end of the inflation hose and configured to attach to a dunnage bag.

The portable dunnage bag inflator of the present disclosure solves the above-described problems. More specifically, since the portable dunnage bag inflator of the present disclosure is mobile due to its attachment to the cargo mover, a user may inflate the dunnage bags immediately after loading cargo into a cargo container In instances in which a compressed air hose is typically brought to the cargo container to inflate dunnage bags, the portable dunnage bag inflator of the present disclosure eliminates the wasted time required to locate the compressed air hose, bring the compressed air hose to the cargo container, and return the compressed air hose to the proper location. The portable dunnage hag inflator of the present disclosure also eliminates the potential safety hazard caused by the compressed air hose laying around the floor of the warehouse or factory.

Further, the portable dunnage hag inflator of the present disclosure eliminates the possibility that the compressed air hose may not be long enough to reach the cargo container. Additionally, since the portable dunnage bag inflator of the present disclosure is its own source of pressurized air, the portable dunnage hag inflator reduces or eliminates the need to manufacture compressed air, store and maintain compressed air, find floor space to store the pneumatic compressor itself, and perform maintenance when the pneumatic compressor breaks down. Further, since the portable dunnage bag inflator of the present disclosure is mounted to the cargo mover, in cases in which the user intermittently inflates and positions dunnage bags during loading, the portable dunnage hag inflator of the present disclosure eliminates the time wasted bringing the compressed air hose back and forth into and out of the cargo container.

In instances in which deflated dunnage bags are typically brought to the stationary pneumatic compressor for inflation. The portable dunnage bag inflator of the present disclosure eliminates the wasted time required to transport the deflated and inflated dunnage bags to and from the stationary pneumatic compressor. Additionally, the portable dunnage bag inflator of the present disclosure reduces the likelihood that the user will underinflate or overinflate the dunnage bags because the user is inflating the dunnage bags near or inside the cargo container and may easily view the voids or spaces into which the dunnage bags will be positioned. Further, since the portable dunnage bag inflator of the present disclosure is its own source of pressurized air, the portable dunnage bag inflator reduces or eliminates the need to manufacture compressed air, store and maintain compressed air, find floor space to store the pneumatic compressor itself, and perform maintenance when the pneumatic compressor breaks down. Additionally, since the portable dunnage bag inflator of the present (disclosure is mounted to the cargo mover, in cases in which the user intermittently inflates and positions dunnage bags during loading, the portable dunnage bag inflator of the present disclosure eliminates the time wasted bringing the dunnage bags back and forth to the stationary pneumatic compressor for inflation.

Additional features and advantages of the present disclosure are described in, and will be apparent from, the following Detailed Description and the Figures.

DETAILED DESCRIPTION

Various embodiments of the present disclosure provide a portable dunnage bag inflator that provides a compact, pressurized source of air and that is easily mounted onto a movable cargo mover (such as a forklift truck or a pallet jack). Generally, the portable dunnage bag inflator includes an impeller-driven blower that, in operation, draws aft at atmospheric pressure through an air intake grid or air inlet into the impeller and expels the air through an inflation hose. Since the portable dunnage bag inflator includes an impeller-driven blower, the pressure of the expelled air is higher than atmospheric pressure. This enables dunnage bags to be inflated to the desired specifications at point-of-use (e.g., during or after loading of cargo into a cargo container) and eliminates the need for a compressed air supply.

Figure 1:
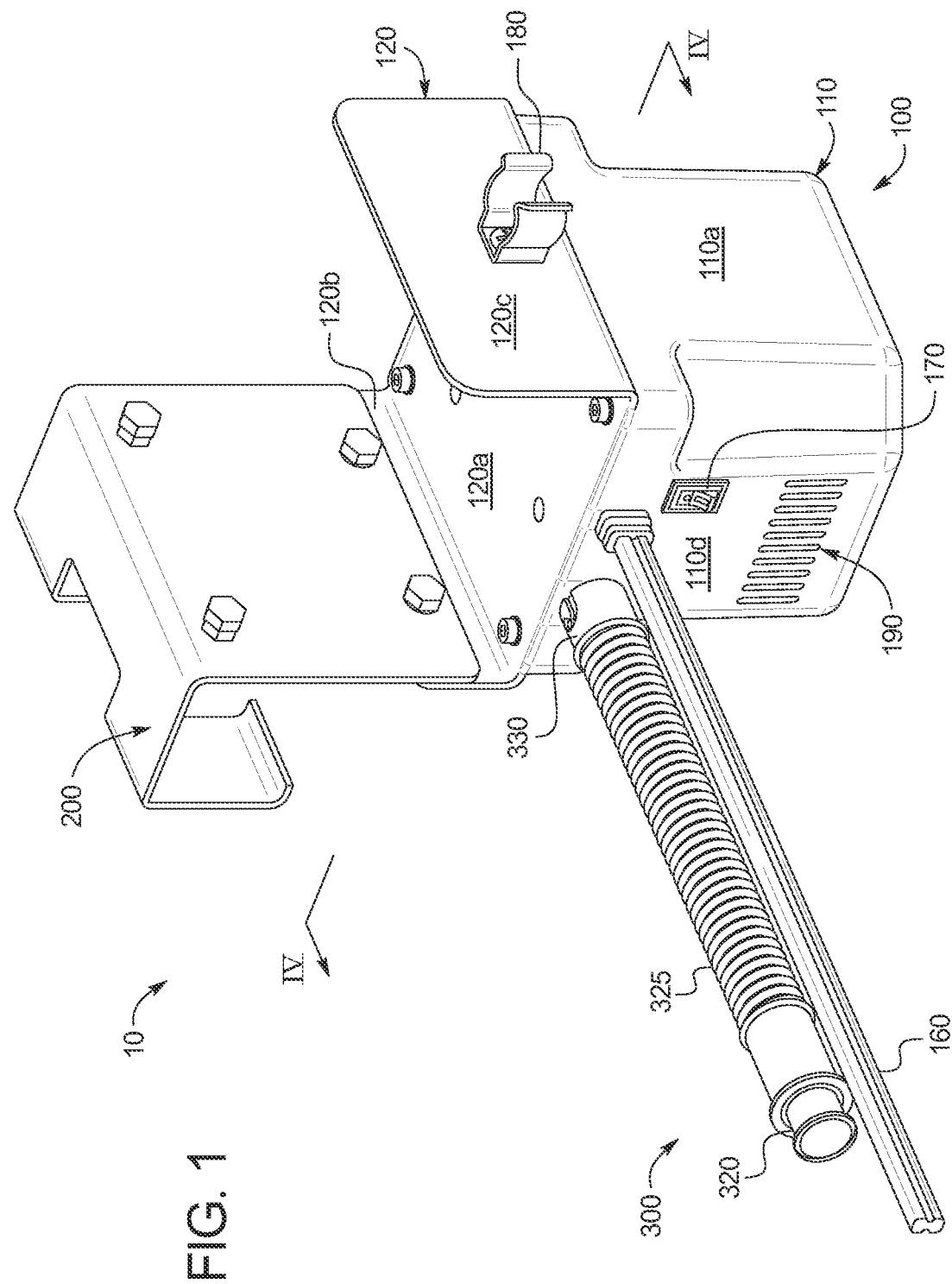
FIG. 1 is a top isometric view of one embodiment of the portable dunnage hag inflator of the present disclosure.
Figure 2:
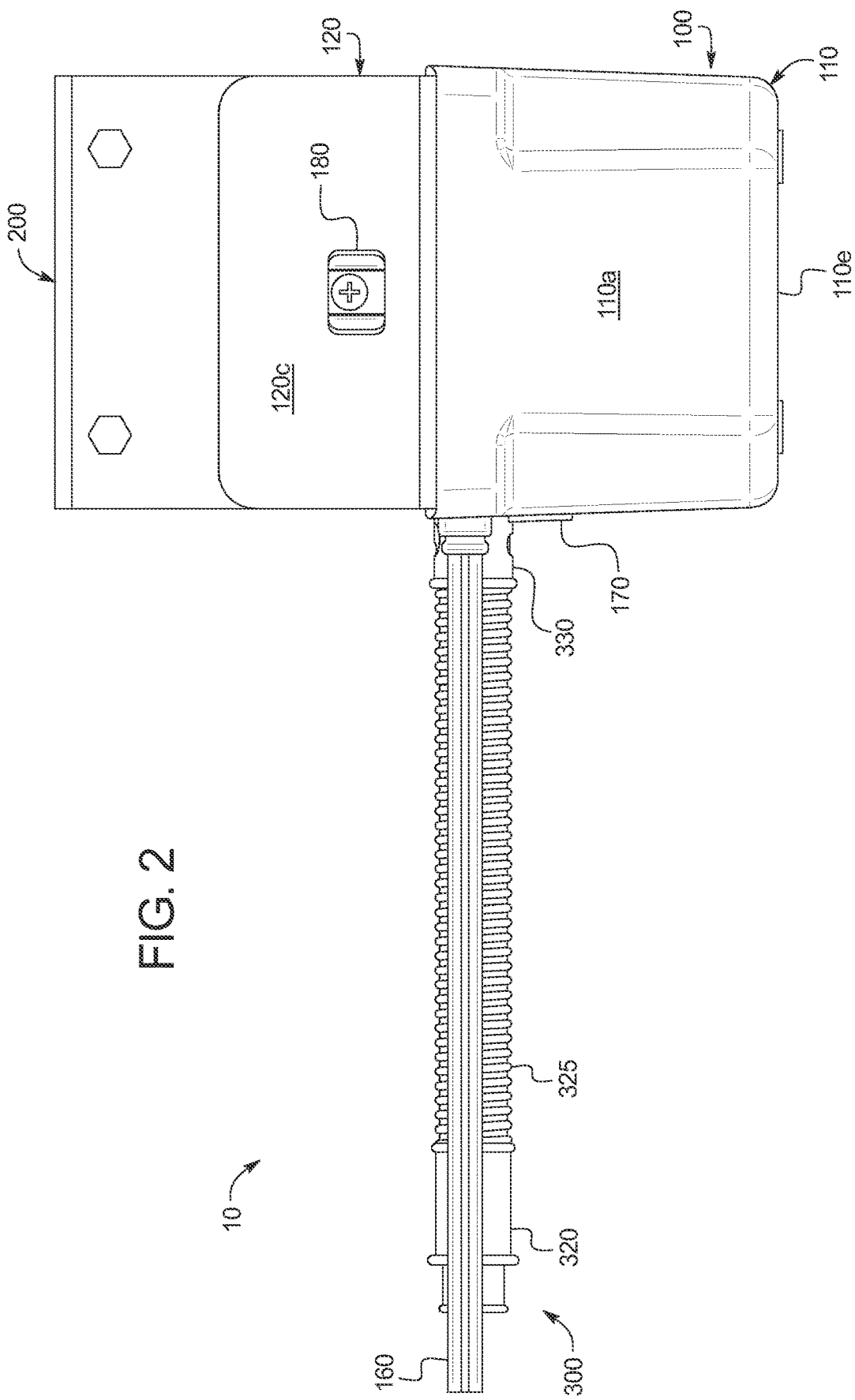
FIG. 2 is a front view of the portable dunnage bag inflator of FIG. 1.
Figure 3:
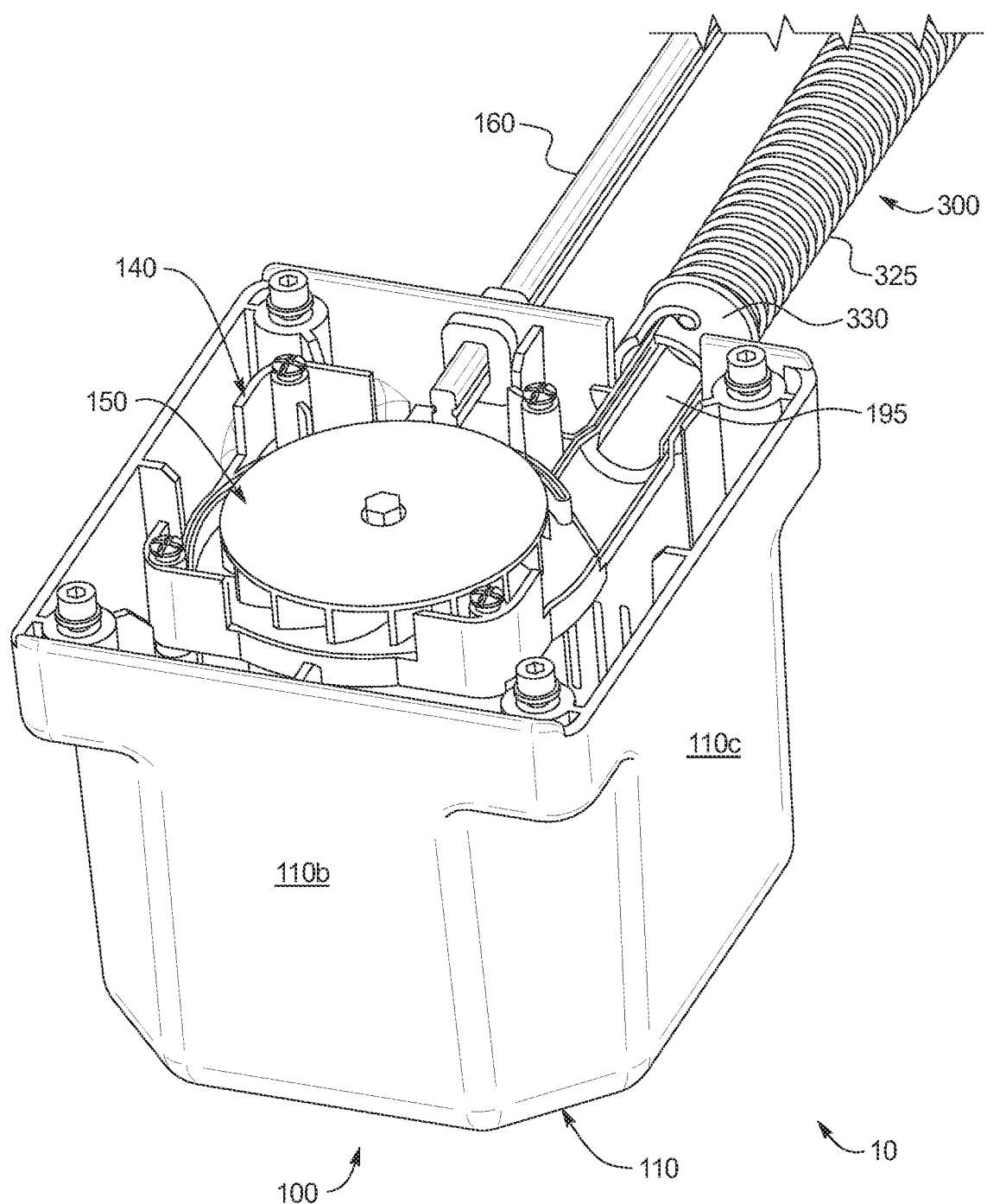
FIG. 3 is a top isometric view of the portable dunnage hag inflator of FIG. 1 with the cover and a portion of the impeller housing of the portable dunnage bag inflator removed.
Figure 4:
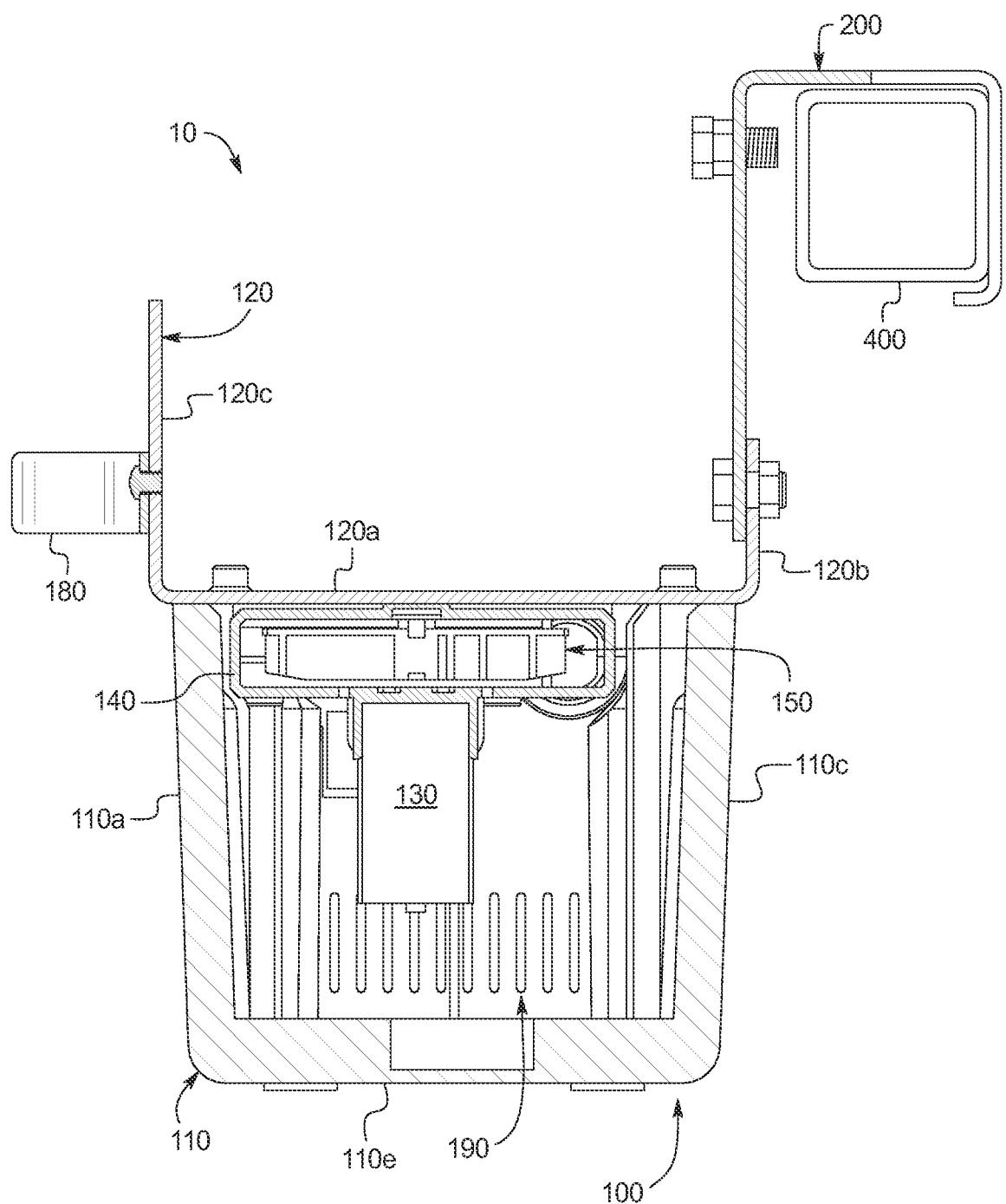
FIG. 4 is a right side cross-sectional view of the portable dunnage bag inflator of FIG. 1 taken substantially along Line IV-IV of FIG. 1.
Figure 5:
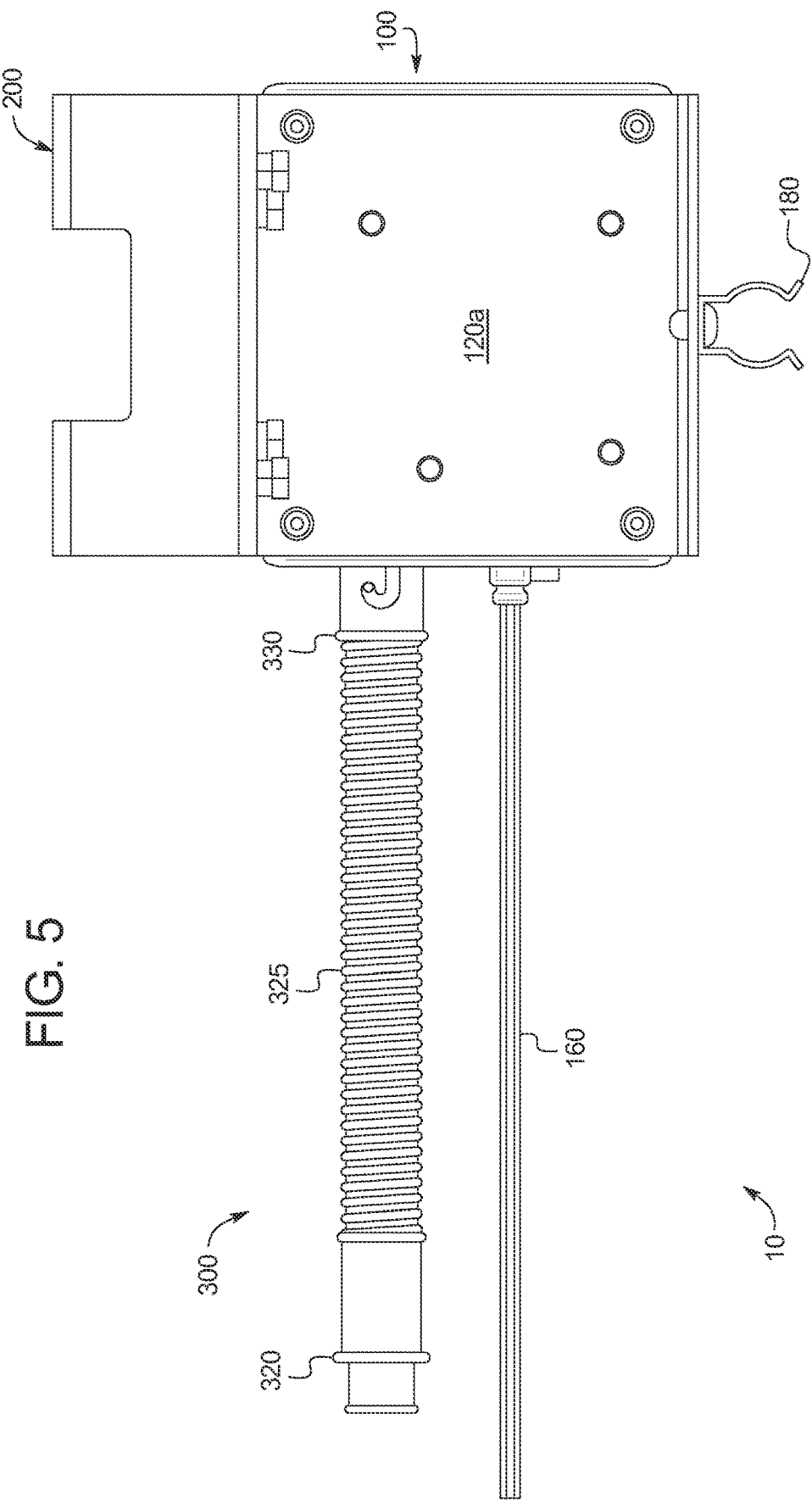
FIG. 5 is a top view of the portable dunnage hag inflator of FIG. 1.
Figure 6:
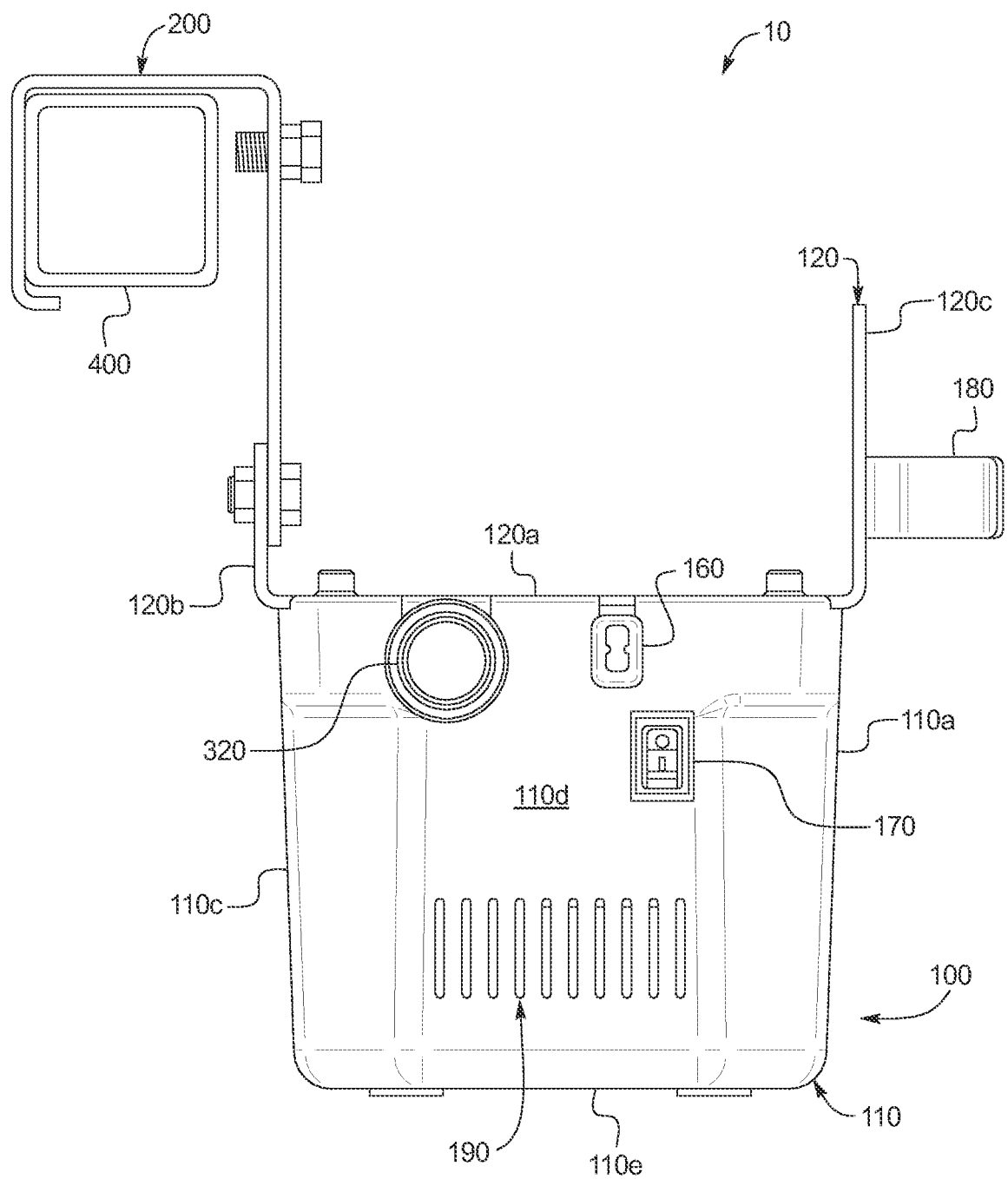
FIG. 6 is a left side view of the portable dunnage rag inflator of FIG. 1.

Referring now to the drawings, FIGS. 1 to 6 illustrate one embodiment of the portable dunnage bag inflator of the present disclosure, which is generally indicated by numeral 10. In this embodiment, the portable dunnage bag inflator 10 includes: (a) a pressurized air generator 100, (b) a cargo mover mounting bracket 200 attached to the pressurized air generator 100 and configured to attach the portable dunnage bag inflator 10 to a frame 400 of a cargo mover (shown in FIGS. 4 and 6); and (c) a removable inflation hose assembly 300 fluidly connected to and configured to receive pressurized air expelled from the pressurized air generator 100.

In this embodiment, the pressurized air generator 100 includes: (a) a generally cubical housing including: (i) a housing base 110 having four side walls 110*a*, 110*b*, 110*c*, and 110*d* and a bottom 110*e*; and (ii) a U-shaped cover 120 having a cover base 120*a* attached to a top of the housing base 110 to enclose components mounted within the housing base 110 and two opposing side walls 120*b* and 120*c* extending from the cover base 120*a*; (b) an electric motor 130 mounted within the housing and operable via a power source of the cargo mover (not shown); (c) an impeller housing 140 mounted within the housing; (d) an impeller 150 mounted within the impeller housing 140 and connected to the electric motor 130 such that the electric motor 130 may drive the impellor 150; (e) a sealed electrical cord 160 that includes an open end connection at one end (not shown) and that is electrically connected to (and used to supply power to) the electric motor 130 at the opposite end; (f) a power switch 170 mounted to the housing and configured to turn the electric motor 130 on or off; and (g) an inflator head securer 180 (such as a retaining clip) mounted to the housing and configured to secure an inflator head 320 of the inflation hose assembly (described below).

In this embodiment, the housing defines a plurality of openings (such as slots) therethrough, which collectively form an air intake grid or air inlet 190 through which the impellor 150 may draw ambient air. In this illustrated embodiment, the plurality of openings forming the air intake grid 190 are defined through one of the side walls 110*d* of the housing base 110, though it should be appreciated that the openings may be defined through any suitable portion of the housing (such as any suitable side wall or side walls of the housing base, the bottom of the housing base, and/or the cover base of the cover).

Additionally, in this embodiment, the housing defines a circular air outlet 195 therethrough through which the impellor expels pressurized air. In this illustrated embodiment, the air outlet 195 is defined through one of the side walls 110*d* of the housing base 110, though it should be appreciated that the air outlet may be defined through any suitable portion of the housing (such as any suitable side wall of the housing base, the bottom of the housing base, or the cover base of the cover).

Further, in this embodiment, the housing is approximately 6 inches (15.25 centimeters)×6 inches×6 inches, though it should be appreciated that the housing may be any suitable size in other embodiments. In other embodiments, the housing takes any suitable shape (such as a cylindrical shape) other than the generally cubical shape.

In this embodiment, the inflator head securer 180 is mounted to the side wall 120*c* of the cover 120 of the housing, though it should be appreciated that the inflator head securer may be mounted to any suitable portion of the housing (such as the housing base or the other side wall of the cover).

In this embodiment, the cargo mover mounting bracket 200 is attached to the side wall 120*b* of the cover 120 of the housing, though it should be appreciated that the cargo mover mounting bracket 200 may be attached to any suitable portion of the housing (such as the housing base or the other side wall of the cover).

In this embodiment, the power switch 170 is mounted to one of the side walls 110*d* of the housing base 110 of the housing, though it should be appreciated that the power switch may be mounted to any suitable portion of the housing (such as any suitable side wall of the housing base, the bottom of the housing base, or the cover). In another embodiment, the power switch is mounted to the inflation hose assembly.

In this embodiment, the inflation hose assembly 300 includes: (a) a flexible and expandable inflation hose 325, (b) a hose connector 330 on one end of the inflation hose 325 and configured to removably connect the inflation hose 325 to the housing base 110 such that the air outlet 195 through the housing base 110 is fluidly connected to the inflation hose 325, and (iii) an inflator head 320 (which is threaded in one embodiment) on the opposite end of the inflation hose 325 and configured to attach to a dunnage bag. In this embodiment, as noted above, the inflation hose assembly 300 is fluidly connected to the pressurized air generator 100 via a connection between the hose connector 330 and the housing base 110 proximate the air outlet 195. It should be appreciated, however, that the inflation hose assembly may be fluidly connected to the pressurized air generator in any other suitable manner.

In this embodiment, the inflation hose is expandable to approximately 15 feet in length (4.572 meters), though in other embodiments the inflation hose is expandable to approximately 10 feet in length (3.048 meters), approximately 20 feet in length (6.096 meters), or any other suitable length. In certain embodiments, the inflation hose assembly and the housing are configured such that the user may replace an inflation hose of one length with an inflation hose of another length as dictated by the particular situation in which the portable dunnage bag inflator is used.

It should be appreciated that the configuration and/or the size of the cargo mover mounting bracket may differ from the illustrated embodiment based on the type and/or size of cargo mover to which the portable dunnage bag inflator is to be mounted. In certain embodiments, the cargo mover mounting bracket is removable such that the user may replace the cargo mover mounting bracket with one that is compatible with the cargo mover to which the user desires to attach the portable dunnage bag inflator.

To prepare the portable dunnage bag inflator 10 for use, the portable dunnage bag inflator 10 is mounted to the frame 400 of the cargo mover using the cargo mover mounting bracket 200 and one or more suitable fasteners such as bolts (as shown) or screws. The open end (not shown) of the electrical cord 160 of the portable dunnage bag inflator 10 is wired into the cargo mover such that the electrical motor 130 of the portable dunnage bag inflator 10 may draw electricity from the power source of the cargo mover. In certain instances, the power source of the cargo mover is a 12 volt battery, though it should be appreciated that the portable dunnage bag inflator may be employed with a cargo mover having any suitable power source.

Once mounted to the cargo mover and connected to the power source of the cargo mover, the portable dunnage bag inflator 10 may be used to inflate a dunnage bag. In operation, a user removes the inflator head 320 from the inflator head securer 180 (if necessary) and unwraps the inflation hose 325 from the cover 120 (if necessary). The user manipulates the power switch 170 into the "ON" position. This causes the electrical motor 130 to spin the impellor 150. This, in turn: (a) causes ambient air at atmospheric pressure to be drawn into the impellor 150 through the air intake grid 190; (b) causes the air to travel around the impellor 150 and out of the impellor 150 through the air outlet 195; (c) causes the air to travel from the air outlet 195 through the inflation hose 325; and (d) causes the air to be expelled from the inflation hose 325. The user then connects the inflator head 320 of the inflation hose assembly 300 to the dunnage bag. Once attached, the air travels into the dunnage bag through the inflator head 320, thus inflating the dunnage bag. When the dunnage bag is inflated to the desired pressure, the user removes the inflator head 320 from the dunnage bag and manipulates the power switch 170 into the "OFF" position. The user may then, if desired, wrap the inflation hose 325 around the cover 120 and insert the inflator head 320 into the inflator head securer 180.

Since the portable dunnage bag inflator is an impellor-driven blower, the pressure of the air expelled through the inflator head into the dunnage bag is higher than atmospheric pressure. In certain embodiments, the pressure of the expelled air is 1.3 to 1.5 pounds per square inch gage pressure.

In one embodiment, the flow rate of air through the portable dunnage bag inflator is approximately 20 cubic feet per minute (approximately 0.566 cubic meters per minute), though it should be appreciated that the portable dunnage bag inflator may be configured to operate at any suitable air flow rate (such as by varying the sizes of one or more of the components or the speed at which the impellor rotates).

In other embodiments, the portable dunnage bag inflator includes its own power source, such as a rechargeable battery or a replaceable battery, to power the electrical motor. In one such embodiment, the portable dunnage bag inflator may still draw electricity from the power source of the forklift truck via the electrical cord as a back-up when its own power source is drained.

In certain embodiments, the housing (and, particularly, the housing base and the cover) may be employed as a hose reel around which the inflation hose may be wound.

In another embodiment, the electrical cord includes a plug rather than an open end connection. In this embodiment, the plug is plugged into an outlet of the cargo mover such that the electrical motor of the portable dunnage bag inflator may draw electricity from the power source of the cargo mover.

It should be appreciated that the embodiment of the portable dunnage bag inflator illustrated in the accompanying Figures employs one example configuration of components and one example size and shape of each of the components. It should be appreciated that other embodiments of the portable dunnage bag inflator may employ different configurations of the components and/or components of different sizes or shapes.

In one embodiment: (a) the housing base, the impeller housing, the impeller, the power switch, the inflator head, the inflation hose, and the hose connector of made of plastic; (b) the cover and the cargo mover mounting bracket are made of painted metal; (c) the electric motor and the electrical cord are made of metal and plastic; and (d) the inflator head securer is made of plastic-coated metal. It should be appreciated, however, that each component may be made of any suitable material or materials.

In certain embodiments, the portable dunnage bag inflator includes a thermal protection device configured to prevent the portable dunnage bag inflator from overheating (and, therefore, to protect the portable dunnage bag inflator from damage caused by such overheating). In various embodiments, the thermal protection device is supported by the housing. In certain such embodiments, the thermal protection device measures the temperature inside the housing of the dunnage bag inflator. When the measured temperature inside the housing of the dunnage bag inflator exceeds a designated maximum operating temperature (which may be any suitable temperature), the thermal protection device automatically cuts the power to the electrical motor (such as by breaking the electrical circuit that provides electricity to the electrical motor), which prevents the electrical motor from operating. Thereafter, once the measured temperature inside the housing of the dunnage bag inflator falls below the designated maximum operating temperature, the thermal protection device automatically restores power to the electrical motor (such as by closing the electrical circuit that provides electricity to the electrical motor), which enables the electrical motor to operate. In other embodiments, the thermal protection device automatically restores power to the electrical motor when the measured temperature inside the housing of the dunnage bag inflator reaches or falls below a second operating temperature that is lower than the designated maximum operating temperature instead of when the measured temperature inside the housing of the dunnage bag inflator falls below the designated maximum operating temperature.

In certain embodiments, the portable dunnage bag inflator is configured to operate in conjunction with a direct current to direct current converter configured to convert a first direct current of a first voltage to a second different direct current of a second different voltage. In one example embodiment, the direct current to direct current converter is configured to convert a 36 volt or a 48 volt direct current (such as that employed by an electrically-powered forklift) to a 12 volt direct current (such as that employed by a gas-powered forklift). This direct current to direct current converter enables the portable dunnage bag inflator to be used in conjunction with a variety of different direct current power sources. It should be appreciated that the first voltage and the second voltage may be any suitable voltages.

While the portable dunnage bag inflator is described herein as being configured to inflate dunnage bags, it should be appreciated that the portable dunnage bag inflator of the present disclosure may, in certain embodiments, be configured to inflate items other than dunnage bags.

It should be understood that modifications and variations may be effected without departing from the scope of the novel concepts of the present disclosure, and it should be understood that this application is to be limited only by the scope of the appended claims.

The invention is claimed as follows:
1. A portable dunnage bag inflator comprising:
a pressurized air generator comprising a housing that defines an air inlet and an air outlet, an impellor within the housing, and an electric motor operably connected to the impellor to rotate the impellor such that the impellor draws air at a first pressure through the air inlet and expels the air at a second higher pressure through the air outlet, wherein the housing includes spaced-apart first and second side walls and spaced-apart third and fourth side walls, wherein the first and second side walls are transverse to the third and fourth side walls, and wherein the third side wall defines the air outlet;

a cargo mover mounting bracket comprising a first side wall, a second side wall shorter than the first side wall, and a top wall that extends between and is transverse to the first and second side walls, wherein the first and second side walls and the top wall define a void sized and shaped to receive a part of a frame of a cargo mover wherein the first side wall of the cargo mover mounting bracket is attached to the first side wall of the housing so the third side wall of the housing is transverse to the walls of the cargo mover mounting bracket and so the void is above the air outlet;

a fastener configured to extend through one of the walls of the cargo mover mounting bracket to, when the cargo mover mounting bracket is attached to the housing and the part of the frame of the cargo mover is received in the void defined by the first side wall, the second side wall, and the top wall of the cargo mover mounting bracket, releasably secure the cargo mover mounting bracket to the part of the frame of the cargo mover; and an inflation hose assembly including a flexible hose having an inflator head at a first end and a connector at a second opposite end, wherein the connector is connected to the air outlet of the housing of the pressurized air generator such that the hose receives the air expelled through the air outlet of the housing of the pressurized air generator, wherein the inflator head is configured to fluidly connect the hose to a dunnage bag, thereby fluidly connecting the dunnage bag to the air outlet of the housing of the pressurized air generator.

2. The portable dunnage bag inflator of claim 1, wherein the first pressure is substantially atmospheric pressure.

3. The portable dunnage bag inflator of claim 2, wherein the second pressure is 1.3 to 1.5 pounds per square inch gage pressure.

4. The portable dunnage bag inflator of claim 1, further comprising a power cord electrically connected to the electric motor and having an open end that is electrically connectable to a battery of the cargo mover to power the electric motor.

5. The portable dunnage bag inflator of claim 1, wherein the air inlet is defined through the third side wall of the housing of the pressurized air generator.

6. The portable dunnage bag inflator of claim 1, wherein the housing includes a cover and a housing base comprising the first, second, third, and fourth side walls of the housing, wherein the cargo mover mounting bracket is attached to the cover.

7. The portable dunnage bag inflator of claim 1, further comprising an inflator head securer mounted to the housing and configured to receive and retain the inflator head of the inflation hose assembly on the housing.

8. The portable dunnage bag inflator of claim 7, wherein the housing includes a cover and a housing base comprising the first, second, third, and fourth side walls of the housing, wherein the inflator head securer is mounted to the cover.

9. The portable dunnage bag inflator of claim 8, wherein the cargo mover mounting bracket is attached to the cover.

10. The portable dunnage bag inflator of claim 1, wherein the first side wall, the second side wall, and the top wall of the cargo mover mounting bracket are oriented relative to one another to form a U-shape.

11. The portable dunnage bag inflator of claim 1, wherein the inflation hose assembly further comprises a power switch configured to control operation of the electric motor.

* * * * *